United States Patent [19]

Phillips et al.

[11] Patent Number: 4,811,613

[45] Date of Patent: Mar. 14, 1989

[54] TWO-AXIS ANGULAR RATE GYROSCOPE

[75] Inventors: Alan C. Phillips, Los Altos; Terence J. O'Brien, San Jose; Charles S. Taylor, San Francisco, all of Calif.

[73] Assignee: Etak, Inc., Menlo Park, Calif.

[21] Appl. No.: 93,007

[22] Filed: Sep. 4, 1987

[51] Int. Cl.$^4$ .............................................. G01C 19/28
[52] U.S. Cl. ..................................... 74/5.6 D; 74/5 F
[58] Field of Search ................. 74/5.6 D, 5 F; 73/504, 73/505; 324/60 C

[56] References Cited

U.S. PATENT DOCUMENTS

| | | | |
|---|---|---|---|
| 2,925,590 | 2/1960 | Boltinghouse et al. | 74/5.6 D X |
| 3,559,492 | 2/1971 | Erdley | 74/5.6 D X |
| 3,918,310 | 11/1975 | Evans et al. | 74/5.6 D |
| 4,587,860 | 5/1986 | Audren | 74/5.6 D X |

Primary Examiner—Rodney H. Bonck
Attorney, Agent, or Firm—Fliesler, Dubb, Meyer & Lovejoy

[57] ABSTRACT

A two-axis angular rate gyroscopic apparatus is provided having a rotatable dish. The dish has a central hub portion and a plurality of flexible members, each of which extends from the hub portion. The entire disk is electrically conductive and connected to a reference potential. A plurality of electrically conductive members which are mounted end-to-end are located on an insulated plate mounted adjacent to the disk. A motor is provided for rotating the disk at approximately 2000 rpm. In addition, each of the flexible members in the disk has a pie-shaped section removed therefrom in order to increase its flexibility. By increasing the flexibility of the movable members, performance at low motor speeds is facilitated. An electronic circuit provides an output corresponding to the differential capacitance between the rotating disk and the members on the plate mounted adjacent thereto.

3 Claims, 1 Drawing Sheet

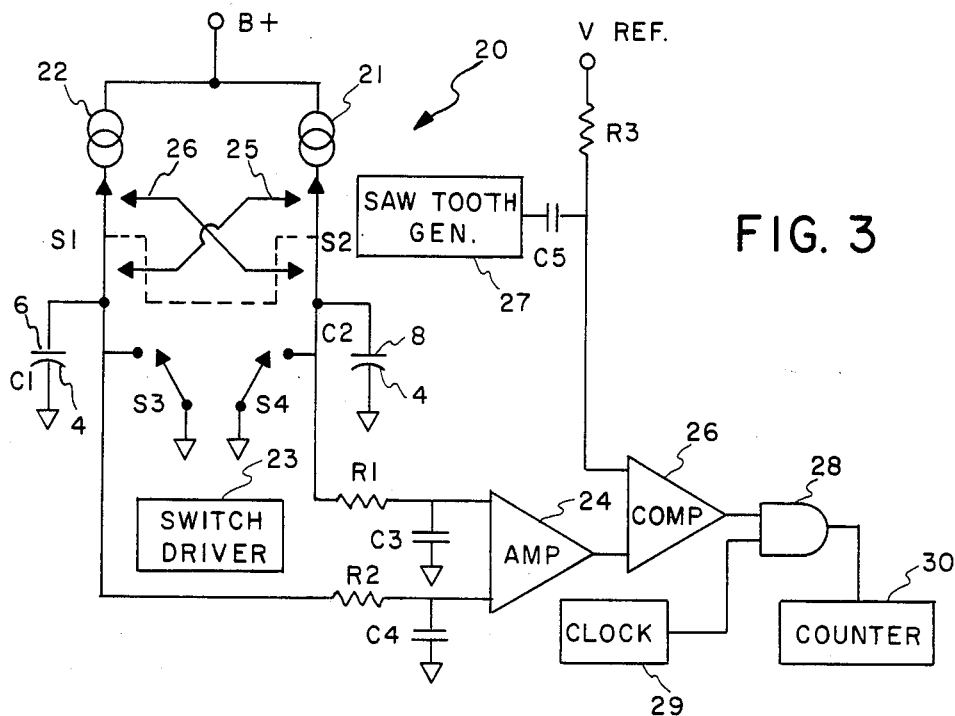
FIG. 3
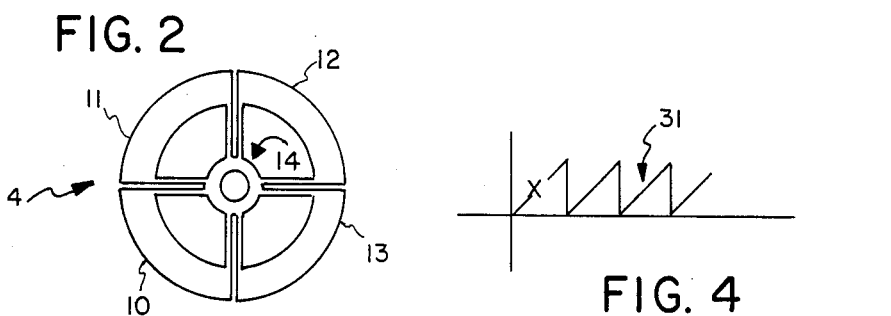
FIG. 2
FIG. 4
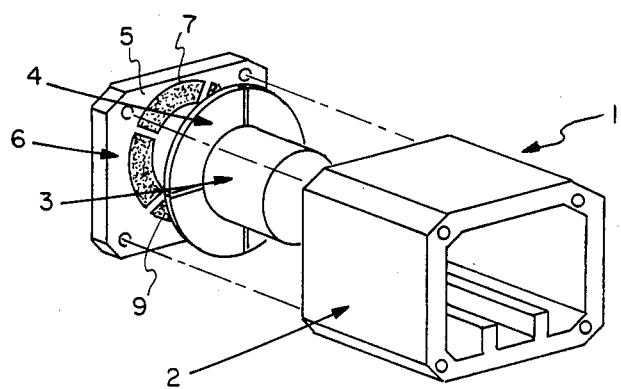
FIG. 1

TWO-AXIS ANGULAR RATE GYROSCOPE

BACKGROUND OF THE INVENTION

1. Field of the Invention

The present invention relates to a two-axis angular rate gyroscopic apparatus in general and in particular to a two-axis angular rate gyroscope having a flexible rotatable disk. The rotatable disk comprises a central hub portion and a plurality of movable perforated members, each of which extend from said hub portion for providing increased performance at low disk speeds.

2. Description of the Prior Art

A two-axis angular rate gyroscopic apparatus comprises a rotatable disk. The disk is rotated by a motor or the like. As the disk is rotated, it is rotated past a stationary sensing mechanism. The sensing mechanism and the disk may comprise a magnetic head assembly, a capacitor assembly, an optical assembly, or the like.

In operation, the rotating disk will tend to undergo precession when the axis of rotation of the disk is rotated about an axis perpendicular to the axis of rotation. If the disk is flexible, the gyroscopic action will cause the disk to flex. The amount of flexure is detected by the sensing mechanism for generating a signal corresponding thereto.

Heretofore, an angular rate gyroscope using a rotating disk has had a disk of uniform thickness requiring that it be rotated at a relatively high speed, e.g. 20,000 rpm, in order to obtain a measurable precession for low angular rate changes. In general, gyroscopes which operate at high rpms are difficult and expensive to manufacture and typically produce a loud and sometimes annoying high-pitched sound. Such a sound and expense is undesirable in many applications, particularly those comprising consumer products involving closely associated human activities. For example, in a vehicular navigation system wherein an angular rate gyroscope is used for sensing the turning and pitching of an automobile, the expense could be prohibitive and the sound would be extremely annoying.

SUMMARY OF THE INVENTION

In view of the foregoing, there is provided in accordance with the present invention a two-axis angular rate gyroscopic apparatus having a rotatable disk. The disk has a central hub portion and a plurality of flexible members. Each of the flexible members extends from the hub portion and has an electrically conductive curved outer portion. A plurality of electrically conductive plate members are mounted end to end on an insulating plate adjacent to the disk. A motor is provided for rotating the disk adjacent to the plate members about an axis of rotation. As the disk is rotated, any movement about an axis perpendicular to the axis of rotation of the disk will cause the flexible disk members to flex toward and away from the plate members, changing the capacitance therebetween. An electrical circuit coupled between the plate members and the flexible disk members detects the differential change in capacitance between opposite ones of the plate members and the flexible members of the rotating disk and generates a signal corresponding to rotation about the orthogonal x and y axes which are perpendicular to the axis of rotation of the disk.

Another important feature of the present invention is the removal of material in the center of each of the flexible members in the rotatable disk. The use of individual members and the removal of material from each, improves their flexibility and facilitates the performance of the apparatus of the present invention at low disk speeds. Also, the individual members tend to "fly" and are therefore air-damped, reducing adverse vibration effects. The spacing between the disks and the plate members is approximately 50 mils.

In these aspects of the present invention the flexible disk members and the removal of material therefrom enables the disk to be rotated at lower speeds and therefore will lower noise levels produced without losing accuracy.

Another important feature of the present invention is the provision of a means for switching the current sources used for charging the capacitive sensing members to compensate for processing and operational inconsistencies between the current sources.

In general, the most difficult specification to achieve in an inexpensive rate gyroscope is the accuracy of the output at no or low angular rate input. Assuming the analog voltage representing angular rate has been generated with sufficient accuracy, the remaining problem becomes how to get the required digital accuracy to the system computer inexpensively.

A majority of the time, a vehicle operates along relatively straight roads and on gradual slopes such that the nominal output of an angular rate gyroscope used in a vehicular navigation system can be centered in an average voltage comparison at a predetermined point on a capacitively coupled sawtooth signal. If the capacitively coupled sawtooth is coupled to one comparator input and the analog angular rate signal to the other comparator input, a gating signal is produced whose duty cycle is very accurately proportional to angular rate for low angular rates. The duty cycle is independent of small changes in sawtooth amplitude if the average value of the capacitively coupled sawtooth is very nearly equal to the average value of the analog rate gyroscope output. The gating signal controls the output of an accurate pulse rate resulting in an average pulse rate to the computer which is accurately proportional to angular rate.

BRIEF DESCRIPTION OF THE DRAWINGS

The above and other objects, features and advantages of the present invention will become apparent from the following detailed description of the accompany drawing, in which:

FIG. 1 is an exploded perspective view of an embodiment of the present invention;

FIG. 2 is a plan view of the rotatable disk member of FIG. 1;

FIG. 3 is a block diagram of a circuit used for providing a signal corresponding to changes in the differential capacitance between the flexible members of the rotating disk and the electrically conductive plate members as the disk is rotated and the apparatus rotated about an axis perpendicular to the axis of rotation of the disk.

FIG. 4 is a diagram of the output of the sawtooth generator shown in FIG. 3.

DESCRIPTION OF THE PREFERRED EMBODIMENTS

Referring to FIG. 1, there is provided in accordance with the present invention a two-axis angular rate gyroscopic apparatus designated generally as 1. In the apparatus 1 there is provided a housing 2. Mounted within the housing 2 is a motor 3. Attached to a shaft of the motor 3 there is provided a rotatable disk 4. Mounted in front of the disk 4 there is provided a plate 5. Mounted end-to-end on the surface of the plate 5 adjacent to the disk 4 there is provided a plurality of four electrically conductive elongated curved plate members 6, 7, 8 and 9.

Referring to FIG. 2, there is provided in the disk 4 a plurality of flexible members 10, 11, 12 and 13. Each of the members 10–13 extends from a hub portion 14 located in the center of the disk member 4. The entire rotating disk is electrically conductive and connected to a reference potential.

The disk 4 is approximately 5 mils thick, has an outside diameter of approximately 2 inches and in operation is rotated by the motor 3 at a speed of approximately 2000 rpm. In the center of each of the flexible members 10–13, a pie-shaped section of the member is removed so as to increase the flexibility of the members.

Referring to FIG. 3, there is provided an electrical circuit designated generally as 20. The circuit 20 is provided for generating a signal corresponding to the differential capacitance between orthogonal pairs of the plate members 6, 7, 8 and 9 and the rotating disk members 4.

In the circuit 20 there is provided a pair of current sources 21 and 22. The current sources 21 and 22 are coupled to a source of potential B+ and to a pair of switch members S1 and S2. The switch member S1 is coupled to ground through a capacitor C1. One plate of the capacitor C1 comprises the rotatable disk 4. The other plate of the capacitor C1 comprises one of the plate members 6–9, namely plate member 6. The switch member S2 is coupled to ground through a capacitor C2. One plate of the capacitor C2 comprises the rotatable disk member 4. The opposite plate member of the capacitor C2 comprises the opposite one of the plate members 6–9, namely plate 8. The switch member S1 is also coupled to ground through a switch S3 and to one input of an amplifier 24 through an RC low pass filter network comprising a resistor R2 and a capacitor C4. The switch S2 is coupled to ground through a switch S4 and to another input of the amplifier 24 through an RC low pass filter network comprising a resistor R1 and a capacitor C3. The capacitors C1 and C2 are also selectively coupled to the current sources 21 and 22 through cross-coupling wires 25 and 26. A clock-driven switch driver 23 controls the operation of the switches S1, S2, S3 and S4.

The output of the amplifier 24 is coupled to one input of a comparator 26. A second input of the comparator 26 is provided by a sawtooth generator 27 which is coupled to the comparator 26 through a capacitor C5. A reference voltage $V_{REF}$ is coupled to the same input of the comparator 26 by means of a resistor R3. The output of the comparator 26 is coupled to one input of an AND gate 28. A second input of the AND gate 28 is coupled to a source of clock pulses 29. The output of the AND gate 28 is coupled to a counter 30.

Referring to FIG. 4, the output of the sawtooth generator 27 comprises a plurality of sawtooth signals 31, as will be further described below.

In addition to the circuit of FIG. 3, there is provided another circuit which is identical to the circuit of FIG. 3 with the exception that the upper plates of the capacitors C1 and C2 comprise the orthogonal pair of plate members 7 and 9.

In operation, the disk 4 is rotated at approximately 2000 rpm. If the apparatus 1 is rotated about an axis orthogonal to the axis of rotation of the disk 4, the flexible disk members 10–13 will flex inwardly and outwardly relative to the elongated plate members 6–9. As this occurs, a differential change in capacitance between the disk 4 and the plate members 6–9 is detected by the circuit of FIG. 3 and its companion circuit (not shown) so as to produce a pair of corresponding output signals.

Sensors or transducers often utilize a balanced pair of capacitors that vary differentially. Sometimes a very necessary characteristic of the circuit sensing this differential variation is that it be as insensitive as possible to differential variations of the two current sources.

Accordingly, the capacitor C1 and C2 and the corresponding capacitors in the companion circuit (not shown) are repetitively cross-coupled to the current sources 21 and 22 so as to compensate for differences in the current sources 21 and 22 as may occur due to temperature and processing variations in the transistors used therein. Similarly, capacitors C1 and C2 are discharged to ground or other constant potential on a periodic basis by means of switches S3 and S4 and thereafter low pass filtered so as to provide, in conditions of no motion, DC inputs to the amplifier 24; the inputs to the amplifier 24 being a voltage proportional to the inverse of the capacitance measured between the plates and the disk. The operation of the switches S1–S4 is provided by a clock in the switch driver 23.

The sawtooth generator 27 provides the sawtooth signal 31 shown in FIG. 4. In practice, the slope of the sawtooth will vary with temperature and time such that for a given input to the comparator 26 from the amplifier 24, the count in the counter 30, which is a measure of the rate of rotation imparted to the apparatus 1, will vary. To reduce the difference in the output of the gate 28 for a given input signal from the amplifier 24, the reference signal $V_{REF}$ is applied to the input of the comparator 26. The reference signal $V_{REF}$ is chosen to be approximately equal to the normal output of the amplifier 24. The normal output of the amplifier 24 is that output which is obtained when the apparatus 1 is not being rotated about an axis perpendicular to the axis of rotation of the disk 4.

A specific application of the apparatus 1 is in an automobile navigation system. Because a majority of time an automobile is moving it is moving in a straight line or in a turn of relatively low angular velocity, the output of the amplifier 24 remains relatively constant. It is only during sharp, relatively high-rate turns that the output of the amplifier 24 will exhibit large excursions from its nominal output. Because of this characteristic, the use of the capacitor C5 to couple the sawtooth generator to the input of the comparator 26 will cause the circuit of FIG. 3 to operate normally about a point X midway between the minimum and maximum amplitude of the sawtooth wave, as shown in FIG. 4. Since the system is operating a majority of the time about the point X, variations in the slope of the sawtooth generator 27 will have minimal effect on the accuracy of the counter 30 for a given output from the amplifier 24.

While a preferred embodiment of the present invention is described above, it is contemplated that various modifications may be made thereto without departing from the spirit and scope thereof. Accordingly, it is intended that the embodiment described be considered only as an illustration of the present invention and that the scope of the invention should not be limited thereto but be determined by reference to the claims hereinafter provided.

What is claimed is:

1. A two-axis angular rate gyroscopic apparatus comprising:
   an electrically conductive rotatable disk, said disk having a central hub portion and a plurality of flexible members, each of which extends from said hub portion and comprises an annular outer portion and a pair of radially extending leg members, said leg members extending from said hub portion;
   means for connecting said disk to a source of reference potential;
   a plurality of electrically conductive plate members which are mounted on an insulating plate adjacent to said disk;
   means for rotating said electrically conductive disk adjacent to said plate members about an axis of rotation; and
   electrical circuit means coupled between said plate members and said electrically conductive flexible members of said disk for measuring a change in the capacitance between each of said plate members and said electrically conductive flexible members of said disk when said electrically conductive flexible members of said rotatable disk undergo precession as said rotatable disk is rotated about an axis perpendicular to said axis of rotation, said change in capacitance being a function of said rate of rotation of said axis of rotation about said axis perpendicular to said axis of rotation.

2. A two-axis angular rate gyroscopic apparatus comprising:
   an electrically conductive rotatable disk, said disk having a central hub portion and a plurality of flexible members, each of which extends from said hub portion and comprises an annular outer portion and a pair of radially extending leg members, said leg members extending from said hub portion;
   means for connecting said disk to a source of reference potential;
   a plurality of pairs of electrically conductive spaced plate members which are mounted end-to-end in a circle on an insulating plate adjacent to said disk such that one of said plate members in a pair of said plate members is mounted opposite to the other of said plate members in said pair;
   means for rotating said electrically conductive disk adjacent to said plate members about an axis of rotation; and
   electrical circuit means coupled between said plate members and said electrically conductive flexible members of said disk for measuring a change in the capacitance between each of said plate members and said electrically conductive flexible members of said disk when said electrically conductive flexible members of said rotatable disk undergo precession as said rotatable disk is rotated about an axis perpendicular to said axis of rotation, said change in capacitance being a function of said rate of rotation of said axis of rotation about said axis perpendicular to said axis of rotation, said electrical circuit means including a pair of current sources for charging opposite ones of said plate members relative to said disk, means for periodically switching said current sources between each of said opposite plate members to compensate for variations in said current sources, means for periodically discharging said opposite plate members relative to said disk, said charging and said discharging producing a pair of sawtooth voltages, and means for filtering and differentially amplifying said sawtooth voltages for providing an output signal which is proportional to the inverse of the differential capacitance between said opposite plates and said disk.

3. A two-axis angular rate gyroscopic apparatus comprising:
   an electrically conductive rotatable disk, said disk having a central hub portion and a plurality of flexible members, each of which extends from said hub portion and comprises an annular outer portion and a pair of radially extending leg members, said leg members extending from said hub portion;
   means for connecting said disk to a source of reference potential;
   a plurality of electrically conductive plate members which are mounted on an insulating plate adjacent to said disk;
   means for rotating said electrically conductive disk adjacent to said plate members about an axis of rotation; and
   electrical circuit means coupled between said plate members and said electrically conductive flexible members of said disk for measuring a change in the capacitance between each of said plate members and said electrically conductive flexible members of said disk when said electrically conductive flexible members of said rotatable disk undergo precession as said rotatable disk is rotated about an axis perpendicular to said axis of rotation, said change in capacitance being a function of said rate of rotation of said axis of rotation about said axis perpendicular to said axis of rotation, said electrical circuit means including a voltage-to-pulse rate converter having a sawtooth voltage generator and a comparator, capacitor means for coupling said sawtooth voltage generator to a first input of said comparator, a source of reference potential, means for coupling said source of reference potential to said first input, and means for coupling said change of capacitance as an input signal to a second input of said comparator.

* * * * *

UNITED STATES PATENT AND TRADEMARK OFFICE
CERTIFICATE OF CORRECTION

PATENT NO. : 4,811,613

DATED : March 14, 1989

INVENTOR(S) : ALAN C. PHILLIPS et al

It is certified that error appears in the above-identified patent and that said Letters Patent is hereby corrected as shown below:

In the abstract, line 2, "dish" (both occurrences) should be --disk--.

Signed and Sealed this

Fourteenth Day of November, 1989

Attest:

JEFFREY M. SAMUELS

Attesting Officer     Acting Commissioner of Patents and Trademarks